(12) United States Patent
Cohen et al.

(10) Patent No.: US 10,731,644 B2
(45) Date of Patent: Aug. 4, 2020

(54) BEVERAGE DISPENSER SYSTEM WITH CONTROLLED PUMP SYSTEM

(71) Applicants: Standex International Corporation, Salem, NH (US); Arbel Agencies Limited, Acco, IL (US)

(72) Inventors: Avihay Cohen, Qiryat Bialik (IL); Robert R. Kimberlin, Christiana, TN (US)

(73) Assignees: Arbel Agencies Limited, Acco (IL); Standex International Corporation, Salem, NH (US)

( * ) Notice: Subject to any disclaimer, the term of this patent is extended or adjusted under 35 U.S.C. 154(b) by 0 days.

(21) Appl. No.: 16/285,840

(22) Filed: Feb. 26, 2019

(65) Prior Publication Data

US 2019/0263652 A1 Aug. 29, 2019

Related U.S. Application Data

(60) Provisional application No. 62/635,575, filed on Feb. 27, 2018.

(51) Int. Cl.
*F04B 53/16* (2006.01)
*B67D 1/10* (2006.01)
*A47J 31/44* (2006.01)
*A47J 31/46* (2006.01)
*B67D 1/00* (2006.01)
(Continued)

(52) U.S. Cl.
CPC ........... *F04B 53/16* (2013.01); *A47J 31/4403* (2013.01); *A47J 31/468* (2018.08); *B67D 1/0021* (2013.01); *B67D 1/0042* (2013.01); *B67D 1/0044* (2013.01); *B67D 1/06* (2013.01); *B67D 1/0888* (2013.01); *B67D 1/10* (2013.01); *B67D 1/122* (2013.01); *B67D 1/1222* (2013.01); *B67D 1/1243* (2013.01); *B67D 2001/0095* (2013.01); *B67D 2210/00031* (2013.01); *F04B 49/02* (2013.01); *F04B 49/065* (2013.01)

(58) Field of Classification Search
CPC ...... F04B 53/16; A47J 31/468; A47J 31/4403; B67D 1/0021; B67D 1/0042; B67D 1/0044
See application file for complete search history.

(56) References Cited

U.S. PATENT DOCUMENTS

| 3,785,526 A | 1/1974 | Shinn |
| 4,209,258 A | 6/1980 | Oakes |

(Continued)

FOREIGN PATENT DOCUMENTS

| WO | 9222493 | 12/1992 |
| WO | 02070396 A1 | 9/2002 |
| WO | 2018031844 A1 | 2/2018 |

OTHER PUBLICATIONS

International Search Report and Written Opinion for PCT/US2019/019514, dated Aug. 26, 2019, 30 pages.

*Primary Examiner* — Vishal Pancholi
(74) *Attorney, Agent, or Firm* — Luedeka Neely Group, P.C.

(57) ABSTRACT

A post-mix beverage dispenser system with removable pumps is disclosed. The system includes a pump enclosure for receiving a plurality of beverage syrup pumps. Each beverage syrup pump may be easily removed from the enclosure and replaced in a tool-less manner. A sensor and control system for the plurality or removable pumps is also disclosed.

19 Claims, 15 Drawing Sheets

(51) Int. Cl.
*B67D 1/12* (2006.01)
*B67D 1/08* (2006.01)
*B67D 1/06* (2006.01)
F04B 49/02 (2006.01)
F04B 49/06 (2006.01)

(56) References Cited

U.S. PATENT DOCUMENTS

| | | | |
|---|---|---|---|
| 4,979,639 A | * | 12/1990 | Hoover ................ B67D 1/0037 137/625.19 |
| 5,137,061 A | | 8/1992 | Deininger et al. |
| 5,492,455 A | | 2/1996 | Durham et al. |
| 5,730,324 A | | 3/1998 | Shannon et al. |
| 5,797,519 A | | 8/1998 | Schroeder et al. |
| 5,842,603 A | | 12/1998 | Schroeder et al. |
| 6,237,810 B1 | | 5/2001 | Credle, Jr. |
| 2006/0208913 A1 | | 9/2006 | Christoffersen et al. |
| 2008/0142674 A1 | | 6/2008 | Dang et al. |
| 2008/0302818 A1 | | 12/2008 | Minard et al. |
| 2010/0036528 A1 | | 2/2010 | Minard et al. |

* cited by examiner

BEVERAGE DISPENSER SYSTEM WITH CONTROLLED PUMP SYSTEM

CROSS-REFERENCE TO RELATED APPLICATIONS

This application claims the benefit of the earlier filing date of provisional patent application, 62/635,575, filed Feb. 27, 2018, the disclosure of which is also herein incorporated by reference.

FIELD

This disclosure relates to the field of fluid pumps. More particularly, this disclosure relates to a pump and related control system for a post-mix beverage dispenser system.

BACKGROUND

Post-mix beverage dispensers combine carbonated water with a concentrated beverage syrup to provide a final beverage for dispensing and consumption. The beverage syrup, which is often a dense and/or viscous fluid, is typically supplied from a bag-in-box syrup container. A syrup pump may be used to move the syrup from the syrup container to the dispensing nozzle.

Conventionally, this syrup pump is a diaphragm-type pump, which is driven by a compressed gas such as carbon dioxide. Problematically, the rubber diaphragms used in such pumps absorb flavors from the syrup. Once the diaphragm in a pump becomes saturated with the flavor of a given syrup, the pump cannot be repurposed to pump a different flavored beverage. The pump becomes effectively dedicated to a single flavor of beverage syrup. More significantly, diaphragm pumps are also prone to leakage of the compressed carbon dioxide used to drive the pump which presents an asphyxiation hazard in confined spaces.

Further still, the diaphragm pumps eventually require service and/or replacement, requiring significant down time while trained technician services pumps system.

Accordingly, what is desired is an improved syrup pump for a beverage dispenser which would eliminate the problem of flavor cross-contamination when pumps are repurposed for different flavored beverages. It is also desired to provide a syrup pump for a beverage dispenser which would eliminate the asphyxiation hazard associated with the use of compressed carbon dioxide or other inert gases.

Furthermore, it is desirable that the syrup pump and associated system be easily and quickly serviceable, preferably without the need for special tools or specially trained technicians. Moreover, it is also desirable to provide an improved system for monitoring and controlling the operation of the syrup pump.

SUMMARY

The above and other needs are met a beverage dispenser system with removable pumps, and its associated pump control system, made in accordance with the present disclosure.

In a first aspect, the present disclosure provides a multiple-pump removable pump system. In one embodiment, a multiple-pump removable pump system includes a pump enclosure for receiving a plurality of removable pumps. This pump enclosure includes least a front panel, a rear panel, first and second side panels, a bottom panel, and a removable top panel. The panels thus define an interior space within the pump enclosure. The rear panel also includes a plurality of openings and at least one horizontal lip disposed above the plurality of openings. This lip having a plurality of slots formed therein so that one slot is positioned above each of the plurality of openings.

The pump system also includes a plurality of removable pumps which are at least partially disposed within the pump enclosure interior space. Each of these removable pump includes a pump housing having an internal pumping chamber, an inlet port and an outlet port, with each of these ports being in flow communication with the pumping chamber. Each removable pump also includes a spring biased retainer pin received within a retainer pin hole formed on an outer surface of the pump housing, Each removable pump also includes a pump motor and a pumping mechanism driven by the pump motor and at least partially disposed within the pumping chamber. This pumping mechanism is capable of receiving a fluid through the inlet port into the pumping chamber at a first pressure and discharging the fluid from the pumping chamber through the outlet port at a second pressure which is greater than the first pressure.

For each removable pump, the pump motor and at least portion of the pump housing are disposed within the pump enclosure interior space, while the inlet port and the outlet port extend through one of the plurality of rear panel openings, and a portion of the retainer pin extends through one of the rear panel slots so as to retain at least a portion of the removable pump within the pump housing.

In certain embodiments of the multiple-pump removable pump system, each removable pump also preferably includes a sliding lock member having a first portion, a second portion which is narrower than the first portion, and a lock retainer opening. This sliding lock member is slidingly movable between a locked position and an unlocked position. Also included is a sliding lock retainer passing through the sliding lock retainer opening to secure the sliding lock member to the pump housing in a position disposed between the inlet port and the outlet port.

The inlet port and the outlet port each include a channel for receiving the first portion of the sliding lock member. When the sliding lock member is in the locked position, the first portion of the sliding lock member is received in the channels of the inlet port and the outlet port so as to engage and retain removable fittings within the inlet port and the outlet port. When the sliding lock member is in the locked position, however, the second portion of the sliding lock member is positioned adjacent the channels of the inlet port and the outlet port, but without engaging and retaining the removable fittings within the inlet port and the outlet port.

Preferably, in some instances, for each removable pump, the inlet port has a first cross-sectional area and the outlet port has a second cross-sectional area which is different from the first cross-sectional area. Also, in some instances, it is preferable that for each removable pump, the inlet port has a first cross-sectional diameter and the outlet port has a second cross-sectional diameter which is different from the first cross-sectional diameter.

In certain embodiments of the multiple-pump removable pump system, the pumping mechanism each removable pump preferably includes a drive gear, having a plurality of drive gear teeth, which is disposed within the pumping chamber and rotatably driven by the pump motor. The pumping mechanism also preferably includes an idler gear, having a plurality of idler gear teeth intermeshed with the drive gear teeth, which is disposed within the pumping chamber and attached to an idler shaft disposed within the pumping chamber.

In certain embodiments of the multiple-pump removable pump system, the pump housing for each removable pump also preferably includes a sensor port in flow communication with the pumping chamber and a pressure transducer disposed adjacent the sensor port. This transducer is in contact with a quantity of the fluid at the second pressure and generating an electrical signal based upon the second pressure.

In certain embodiments of the multiple-pump removable pump system, the removable pumps are preferably beverage syrup pumps.

In a second aspect, the present disclosure provides a post-mix beverage dispenser system. In one embodiment, the post-mix beverage dispenser system includes a beverage dispensing station having a plurality of beverage mixing and dispensing nozzles; a supply of carbonated water in flow communication with each of the beverage mixing and dispensing nozzles; and a plurality of beverage syrup containers, each container having a supply of concentrated beverage syrup.

The post-mix beverage dispenser system also includes a multiple-pump syrup pump system. This syrup pump system, in turn, includes a pump enclosure for receiving a plurality of syrup pumps. This pump enclosure includes least a front panel, a rear panel, first and second side panels, a bottom panel, and a removable top panel. The panels thus define an interior space within the pump enclosure. The rear panel also includes a plurality of openings and at least one horizontal lip disposed above the plurality of openings. This lip having a plurality of slots formed therein so that one slot is positioned above each of the plurality of openings.

The syrup pump system also includes a plurality of syrup pumps which are at least partially disposed within the pump enclosure interior space. Each of these syrup pump includes a pump housing having an internal pumping chamber, an inlet port and an outlet port, with each of these ports being in flow communication with the pumping chamber. Each syrup pump also includes a spring biased retainer pin received within a retainer pin hole formed on an outer surface of the pump housing, Each syrup pump also includes a pump motor and a pumping mechanism driven by the pump motor and at least partially disposed within the pumping chamber. This pumping mechanism is capable of receiving a fluid through the inlet port into the pumping chamber at a first pressure and discharging the fluid from the pumping chamber through the outlet port at a second pressure which is greater than the first pressure.

For each syrup pump, the pump motor and at least portion of the pump housing are disposed within the pump enclosure interior space, while the inlet port and the outlet port extend through one of the plurality of rear panel openings, and a portion of the retainer pin extends through one of the rear panel slots so as to retain at least a portion of the removable pump within the pump housing.

In certain embodiments of the post-mix beverage dispenser system, each syrup pump also preferably includes a sliding lock member having a first portion, a second portion which is narrower than the first portion, and a lock retainer opening. This sliding lock member is slidingly movable between a locked position and an unlocked position. Also included is a sliding lock retainer passing through the sliding lock retainer opening to secure the sliding lock member to the pump housing in a position disposed between the inlet port and the outlet port.

The inlet port and the outlet port each include a channel for receiving the first portion of the sliding lock member. When the sliding lock member is in the locked position, the first portion of the sliding lock member is received in the channels of the inlet port and the outlet port so as to engage and retain removable fittings within the inlet port and the outlet port. When the sliding lock member is in the locked position, however, the second portion of the sliding lock member is positioned adjacent the channels of the inlet port and the outlet port, but without engaging and retaining the removable fittings within the inlet port and the outlet port.

Preferably, in some instances, for each syrup pump, the inlet port has a first cross-sectional area and the outlet port has a second cross-sectional area which is different from the first cross-sectional area. Also, in some instances, it is preferable that, for each syrup pump, the inlet port has a first cross-sectional diameter and the outlet port has a second cross-sectional diameter which is different from the first cross-sectional diameter.

In certain embodiments of the post-mix beverage dispenser system, the pumping mechanism each syrup pump preferably includes a drive gear, having a plurality of drive gear teeth, which is disposed within the pumping chamber and rotatably driven by the pump motor. The pumping mechanism also preferably includes an idler gear, having a plurality of idler gear teeth intermeshed with the drive gear teeth, which is disposed within the pumping chamber and attached to an idler shaft disposed within the pumping chamber.

In certain embodiments of the post-mix beverage dispenser system, the pump housing for each syrup pump also preferably includes a sensor port in flow communication with the pumping chamber and a pressure transducer disposed adjacent the sensor port. This transducer is in contact with a quantity of the fluid at the second pressure and generating an electrical signal based upon the second pressure.

In a third aspect, the present disclosure provides a multiple-pump controlled pump system. In one embodiment, the controlled pump system includes a pump enclosure adapted for receiving a plurality of removable pumps and a plurality of removable pumps at least partially disposed within the pump enclosure.

Each removable pump, in turn, includes a pump housing having an internal pumping chamber, an inlet port, an outlet port, and a sensor port, with each of these ports being in flow communication with the pumping chamber.

Each removable pump also includes a pump motor and a pumping mechanism driven by the pump motor and at least partially disposed within the pumping chamber. This pumping mechanism is capable of receiving a fluid through the inlet port into the pumping chamber at a first pressure and discharging the fluid from the pumping chamber through the outlet port at a second pressure which is greater than the first pressure.

In addition, each removable pump also includes a pressure transducer disposed adjacent the sensor port. This transducer is in contact with a quantity of the fluid at the second pressure and generates an electrical signal based upon the second pressure. Also includes is a programmable micro controller, which receives the electrical signals from the pressure transducer, and is electrically connected to the pump motor and capable of starting and stopping the pump motor.

The controlled pump system includes a common control panel for controlling each of the plurality of removable pumps. This control panel includes at least one reset switch for each removable pump electrically connected to the programmable micro controller for the removable pump, as well as at least one pump condition indicator for each removable pump. The at least one pump condition indicator is electrically connected to the programmable micro controller for the removable pump, and each pump condition indicator is capable of indicating a plurality of pump conditions.

In certain embodiments of the controlled pump system, the pumping mechanism for each removable pump preferably includes a drive gear, having a plurality of drive gear teeth, which is disposed within the pumping chamber and rotatably driven by the pump motor. The pumping mechanism also preferably includes an idler gear, having a plurality of idler gear teeth intermeshed with the drive gear teeth, which is disposed within the pumping chamber and attached to an idler shaft disposed within the pumping chamber. The sensor port is located downstream of the drive gear and the idler gear.

In certain embodiments of the controlled pump system, the pressure transducer for each of the plurality of removable pumps preferably includes a ceramic piezo disc.

In certain embodiments of the controlled pump system, the control panel preferably includes at least two pump condition indicators for each removable pump, with each pump condition indicator being capable of indicating a plurality of pump conditions.

In certain embodiments of the controlled pump system, the least one reset switch for each removable pump is preferably a membrane switch and the at least one pump condition indicator for each removable pump is incorporated into this membrane switch.

In certain embodiments of the controlled pump system, for each of the plurality of removable pumps, the micro controller is preferably programmed to stop the pump motor and the at least one pump condition indicator signals a first pump condition if the second pressure exceeds a first predetermined pressure threshold.

In certain embodiments of the controlled pump system, for each of the plurality of removable pumps, the micro controller is preferably programmed to stop the pump motor and the at least one pump condition indicator signals a second pump condition if the second pressure drops a second predetermined pressure threshold.

In certain embodiments of the controlled pump system, for each of the plurality of removable pumps, the micro controller is preferably programmed to start the pump motor and the at least one pump condition indicator signals a third pump condition if the second pressure is between the first and the second predetermined pressure thresholds.

In certain embodiments of the controlled pump system, for each of the plurality of removable pumps, the micro controller is preferably programmed to stop the pump motor and the at least one pump condition indicator signals a fourth pump condition if the second pressure remains between the first and the second predetermined pressure thresholds for a time period which exceeds a predetermined time threshold.

In certain embodiments of the controlled pump system, for each of the plurality of removable pumps, the micro controller is preferably programmed to stop the pump motor and the at least one pump condition indicator signals a fourth pump condition if the second pressure remains between a third predetermined pressure threshold and a fourth predetermined pressure threshold for a time period which exceeds a predetermined time threshold.

In certain embodiments of the controlled pump system, each of the removable pumps are preferably beverage syrup pumps.

In a fourth aspect, the present disclosure provides a post-mix beverage dispenser system. In one embodiment, the beverage dispenser system includes a beverage dispensing station having a plurality of beverage mixing and dispensing nozzles; a supply of carbonated water in flow communication with each of the beverage mixing and dispensing nozzles; and a plurality of beverage syrup containers, each container having a supply of concentrated beverage syrup.

The post-mix beverage dispenser system also includes a multiple-pump syrup pump system. This syrup pump system, in turn, includes a pump enclosure adapted for receiving a plurality of syrup pumps and a plurality of syrup pumps at least partially disposed within the pump enclosure.

Each syrup pump, in turn, includes a pump housing having an internal pumping chamber, an inlet port in flow communication with one of the beverage syrup containers and with the pumping chamber, an outlet port in flow communication with the pumping chamber and with one of the beverage mixing and dispensing nozzles, and a sensor port in flow communication with the pumping chamber.

Each syrup pump also includes a pump motor and a pumping mechanism driven by the pump motor and at least partially disposed within the pumping chamber. This pumping mechanism is capable of receiving a fluid through the inlet port into the pumping chamber at a first pressure and discharging the fluid from the pumping chamber through the outlet port at a second pressure which is greater than the first pressure.

In addition, each syrup pump also includes a pressure transducer disposed adjacent the sensor port. This transducer is in contact with a quantity of the fluid at the second pressure and generates an electrical signal based upon the second pressure. Also includes is a programmable micro controller, which receives the electrical signals from the pressure transducer, and is electrically connected to the pump motor and capable of starting and stopping the pump motor.

The syrup pump system includes a common control panel for controlling each of the plurality of syrup pumps. This control panel includes at least one reset switch for each removable pump electrically connected to the programmable micro controller for the removable pump, as well as at least one pump condition indicator for each removable pump. The at least one pump condition indicator is electrically connected to the programmable micro controller for the syrup pump, and each pump condition indicator is capable of indicating a plurality of pump conditions.

In certain embodiments of the post-mix beverage dispenser system, the pumping mechanism for each syrup pump preferably includes a drive gear, having a plurality of drive gear teeth, which is disposed within the pumping chamber and rotatably driven by the pump motor. The pumping mechanism also preferably includes an idler gear, having a plurality of idler gear teeth intermeshed with the drive gear teeth, which is disposed within the pumping chamber and attached to an idler shaft disposed within the pumping chamber. The sensor port is located downstream of the drive gear and the idler gear.

In certain embodiments of the post-mix beverage dispenser system, the pressure transducer for each of the plurality of syrup pumps preferably includes a ceramic piezo disc.

In certain embodiments of the post-mix beverage dispenser system, the control panel preferably includes at least two pump condition indicators for each syrup pump, with each pump condition indicator being capable of indicating a plurality of pump conditions.

In certain embodiments of the post-mix beverage dispenser system, the least one reset switch for each removable pump is preferably a membrane switch and the at least one pump condition indicator for each removable pump is incorporated into this membrane switch.

In certain embodiments of the post-mix beverage dispenser system, for each of the plurality of syrup pumps, the micro controller is preferably programmed to stop the pump motor and the at least one pump condition indicator signals a first pump condition if the second pressure exceeds a first predetermined pressure threshold.

In certain embodiments of the post-mix beverage dispenser system, for each of the plurality of syrup pumps, the micro controller is preferably programmed to stop the pump motor and the at least one pump condition indicator signals a second pump condition if the second pressure drops a second predetermined pressure threshold.

In certain embodiments of the post-mix beverage dispenser system, for each of the plurality of syrup pumps, the micro controller is preferably programmed to start the pump motor and the at least one pump condition indicator signals a third pump condition if the second pressure is between the first and the second predetermined pressure thresholds.

In certain embodiments of the post-mix beverage dispenser system, for each of the plurality of syrup pumps, the micro controller is preferably programmed to stop the pump motor and the at least one pump condition indicator signals a fourth pump condition if the second pressure remains between the first and the second predetermined pressure thresholds for a time period which exceeds a predetermined time threshold.

In certain embodiments of the post-mix beverage dispenser system, for each of the plurality of syrup pumps, the micro controller is preferably programmed to stop the pump motor and the at least one pump condition indicator signals a fourth pump condition if the second pressure remains between a third predetermined pressure threshold and a fourth predetermined pressure threshold for a time period which exceeds a predetermined time threshold.

Thus according to the present disclosure, a pump system is provided having a plurality of pumps for beverage syrups and other fluids. Each of the pumps may be quickly and easily installed in, or removed from, a common pump enclosure—without the need for special tools or specially trained technicians.

In addition, the removable pumps are preferably driven by an electric motor rather being gas driven diaphragm pumps. Advantageously then, the problem of syrup flavors being absorbed by the rubber components of a diaphragm pump and subsequently leaching out into other beverage syrups (i.e. flavor cross-contamination) is eliminated. Consequently, the syrup pumps according to the present disclosure may be readily repurposed for different flavored beverages if desired. Moreover, by eliminating the gas driven diaphragm pump, leakage of carbon dioxide or other inert gases from the diaphragm pump is likewise eliminated along with the associated confined space asphyxiation hazard.

Further still the pump system of the present disclosure provides an improved system for monitoring and controlling the operation of the syrup pumps.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
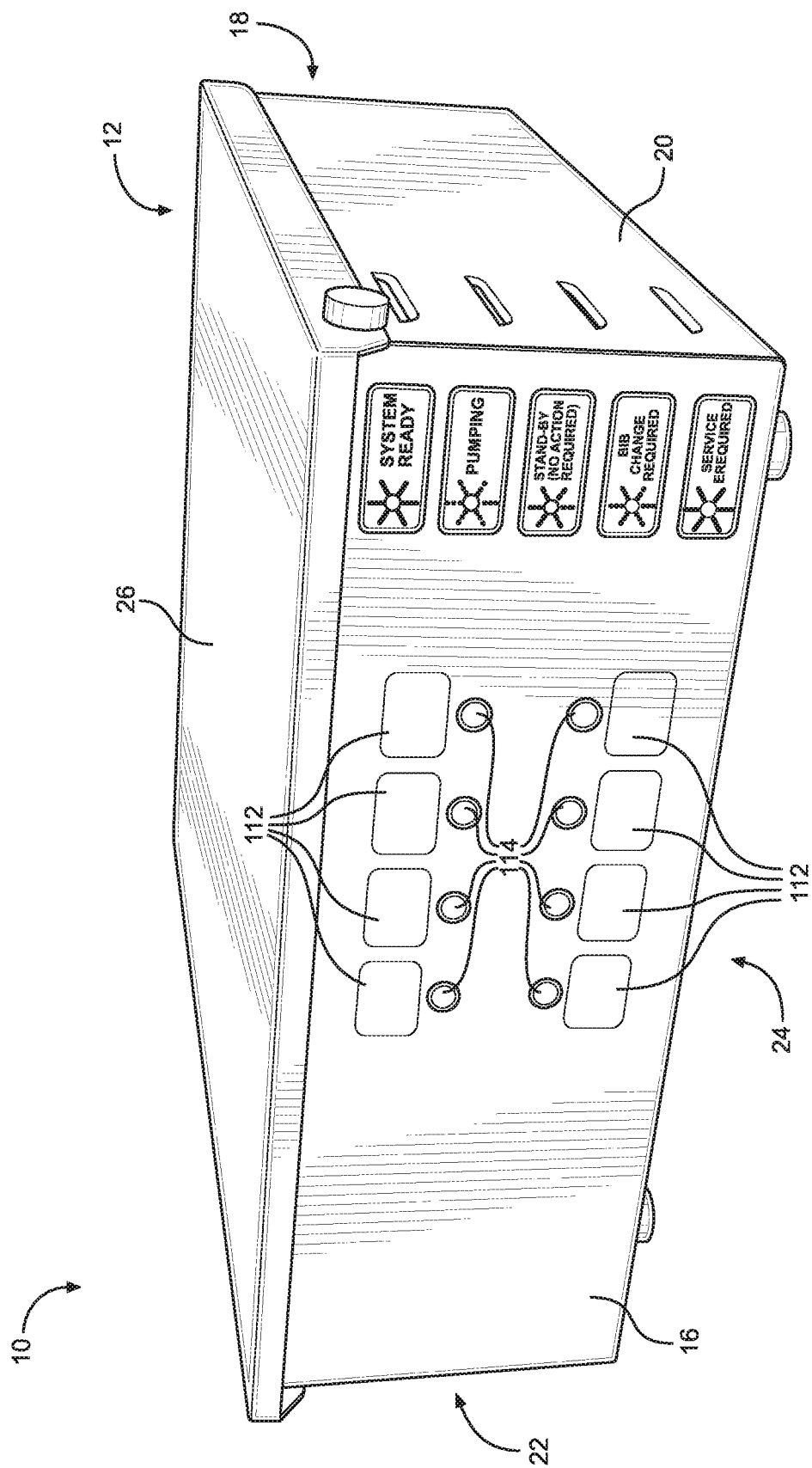
FIG. 1 is a front perspective view of a pump enclosure in accordance with one embodiment of the present disclosure.
Figure 2:
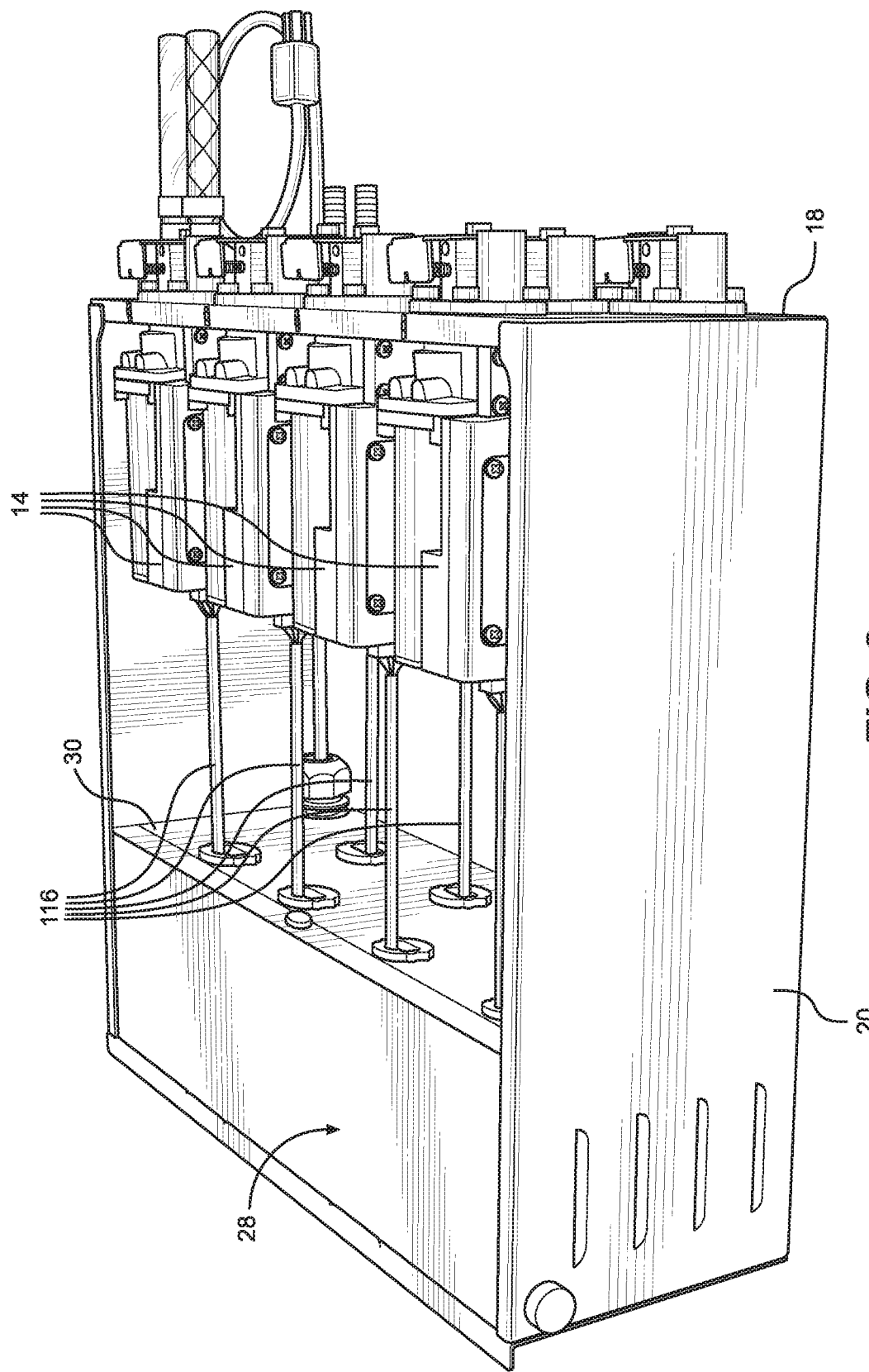
FIG. 2 is a top perspective view of a pump system in accordance with one embodiment of the present disclosure.
Figure 3:
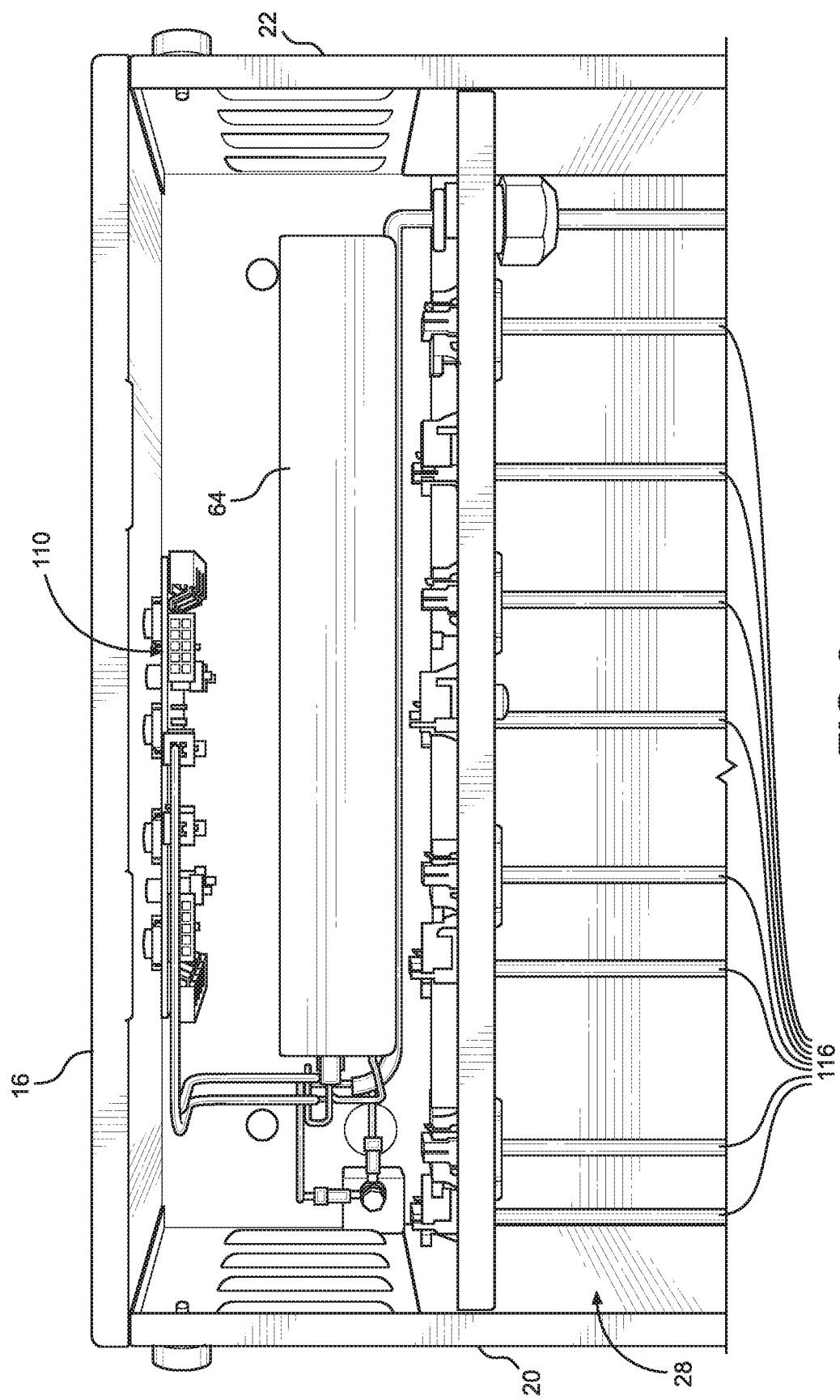
FIG. 3 is a top plan view of a portion of a pump system in accordance with one embodiment of the present disclosure.

The present disclosure relates to a multiple-pump removable pump system and a related control system. The pump and control systems are particularly suited for pumping beverage syrups in a post-mix beverage dispenser.

As shown in FIGS. 1-4, a multiple-pump removable pump system 10 according to the present disclosure includes a pump enclosure 12 for receiving a plurality of removable pumps 14. This pump enclosure 12 is generally formed from steel or another metal material, or from plastic and includes least a front panel 16, a rear panel 18, first and second side panels 20, 22, a bottom panel 24, and a removable top panel 26. The panels thus define an interior space 28 within the pump enclosure 12. In some instances, the enclosure 12 may also include an internal divider 30 which partitions the interior space 28 into two sections. The rear panel 18 also includes a plurality of openings 32 and at least one horizontal lip 34 disposed above the plurality of openings 32. This lip 34 includes a plurality of slots 36 formed therein, so that one slot 36 is positioned above each of the plurality of openings 32.

The pump system 10 also includes a plurality of pumps 14 which are at least partially disposed within the pump enclosure interior space 28. Preferably each pump may be inserted into, and removed from, the pump enclosure 12 in a simple manner and without the need for any tools.

Preferably, each of the removable pumps 14 are beverage syrup pumps, suitable for use in, for instance, a post-mix beverage dispenser system.

Figure 5:
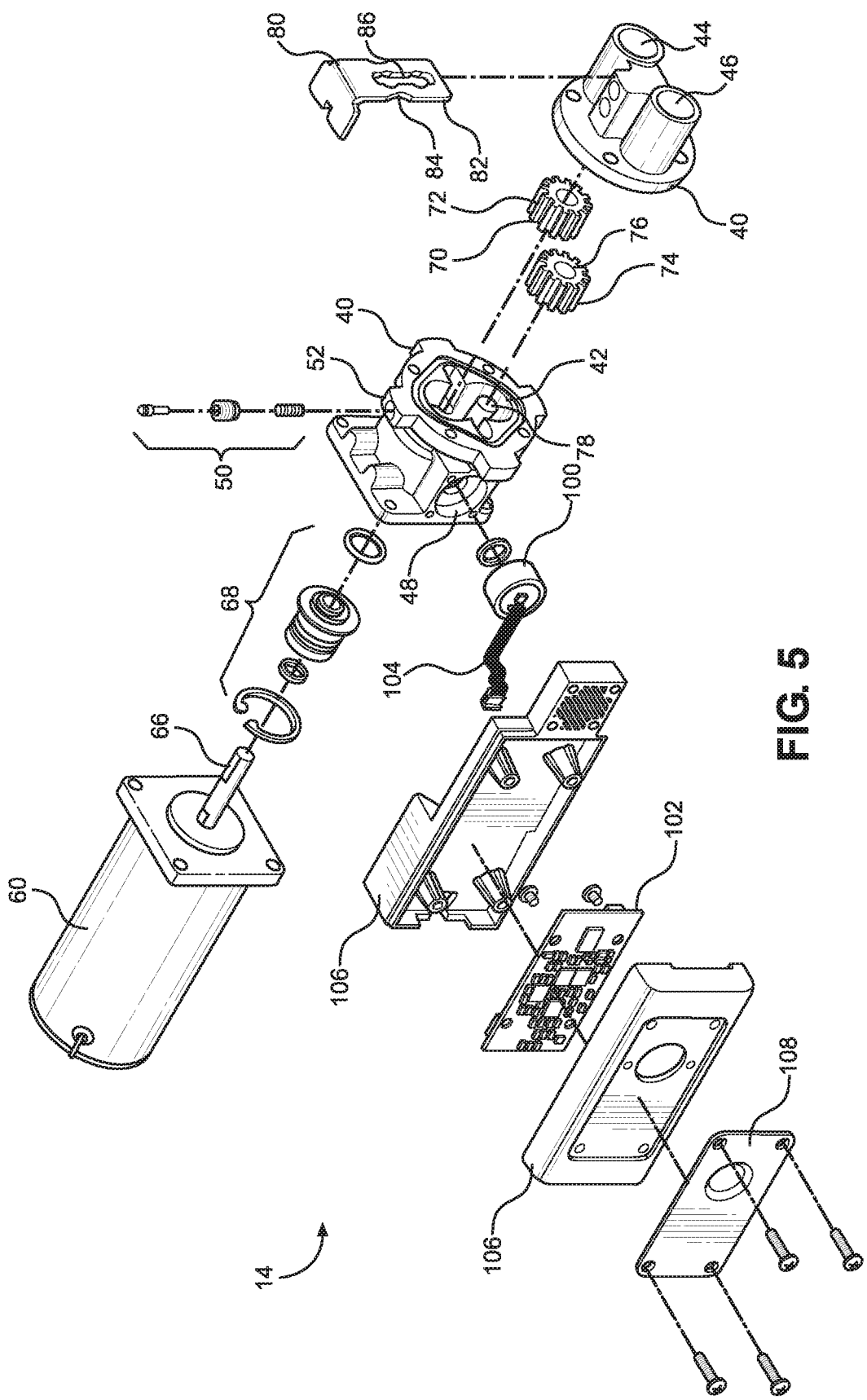
FIG. 5 is an exploded perspective view of a portion of a beverage syrup pump in accordance with one embodiment of the present disclosure.

With further reference to FIG. 5, each of these removable pumps 14 includes a pump housing 40 which is generally formed from a high strength material, such as brass, stainless steel, or another metal or alloy. Alternatively, the pump housing 40 may be molded from a polymeric material, preferably a polymeric material embedded with a fiber reinforcement material, such as carbon fiber or fiberglass filaments.

The pump housing 40 includes an internal pumping chamber 42, an inlet port 44, an outlet port 46, and preferably a sensor port 48, with each of these ports being in flow communication with the pumping chamber 42. Each removable pump 14 also includes a spring biased retainer pin 50 received, preferably captively received, within a retainer pin hole 52 formed on an outer surface of the pump housing 40.

In addition, each removable pump 14 includes a pump motor 60 and a pumping mechanism driven by the pump motor 60 and at least partially disposed within the pumping chamber 42. The pump motor 60 is preferably an electric motor. Preferably, a common power supply 64 is disposed within the enclosure 12 and used to power all of the electric pump motors.

The pumping mechanism is generally driven by the pump motor 60 via a drive shaft 66. In some instances, the drive shaft 66 may be directly coupled to the pumping mechanism. In such cases, the pump housing 40 further includes a drive shaft opening through which the drive shaft 66 extends into the pump housing 40 and a seal assembly 68 to prevent fluid leakage through the drive shaft opening. In other instances, the drive shaft 66 may be magnetically coupled to the pumping mechanism.

The pumping mechanism is capable of receiving a fluid through the inlet port 44 into the pumping chamber 42 at a first pressure and discharging the fluid from the pumping chamber 42 through the outlet port 46 at a second pressure which is greater than the first pressure.

For instance, in certain embodiments of the multiple-pump removable pump system 10, the pumping mechanism for each removable pump 14 is preferably a gear pump mechanism. This gear pump preferably includes a drive gear 70. The drive gear 70 includes a plurality of drive gear teeth 72 and is disposed within the pumping chamber 42 and rotatably driven by the pump motor 60. The pumping mechanism also preferably includes an idler gear 74. The idle gear also includes a plurality of idler gear teeth 76 intermeshed with the drive gear teeth 72 and is also disposed within the pumping chamber 42. The idler gear 74 is attached to an idler shaft 78 disposed within the pumping chamber 42.

During operation of the gear pump, fluid is received into the pumping chamber 42 from the inlet port 44 at a first or initial pressure. The drive shaft 66 rotates the drive gear 70 which in turn rotates the idler gear 74 due to the intermeshed teeth of the two gears. As the two gears rotate, fluid is trapped by the gear teeth. The fluid then travels around the inner perimeter of the pumping chamber 42 until it is forced out through the outlet port 46 at a second pressure which is greater than the first or initial pressure.

Figure 4:
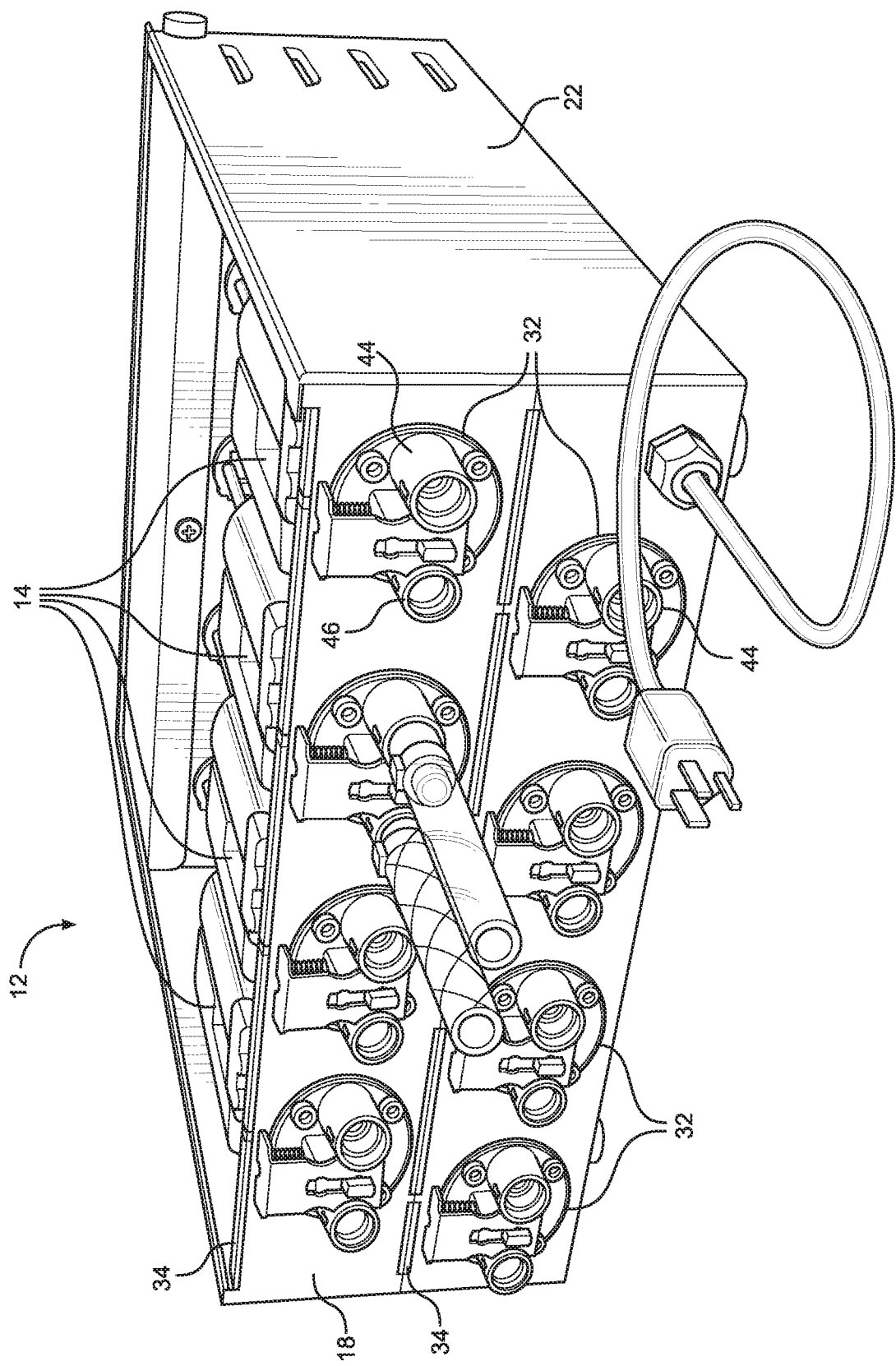
FIG. 4 is a rear perspective view of a pump system in accordance with one embodiment of the present disclosure.

For each removable pump 14, the pump motor 60 and at least portion of the pump housing 40 are disposed within the pump enclosure interior space 28, while the inlet port 44 and the outlet port 46 extend through one of the plurality of rear panel openings 32, as seen in FIG. 4. In this position, the removable pump 14 is secured in place by a portion of the retainer pin 50 which extends through one of the rear panel slots 36 of the enclosure 12 so as to retain at least a portion of the removable pump 14 within the pump housing 40.

Figure 6:
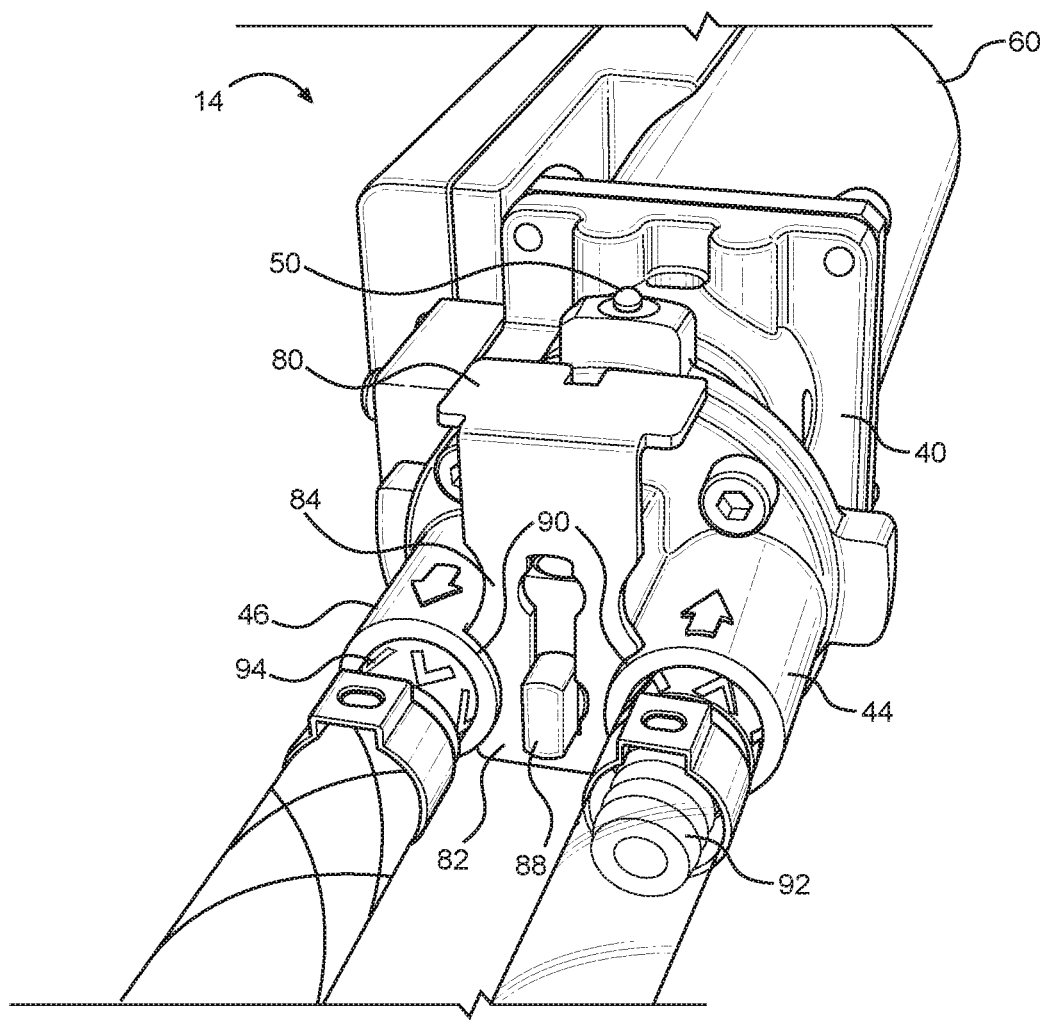
FIGS. 6-9 are rear perspective views illustrating steps in the disconnection of a beverage syrup pump in accordance with one embodiment of the present disclosure.

Preferably each removable pump 14 of the multiple-pump removable pump system 10 is also configured so that the inlet and outlet ports 44, 46 may be quickly connected or disconnected to supply and discharge lines in a tool-less manner. As shown in FIG. 6, this may be accomplished by providing a sliding lock member 80 which is movably attached to the pump housing 40 adjacent the inlet and outlet ports 44, 46. The sliding lock member 80 has a first portion 82, a second portion 84 which is narrower than the first portion 82, and a lock retainer opening 86. The sliding lock member 80 is slidingly movable between a locked position and an unlocked position. Also included is a sliding lock retainer 88 passing through the sliding lock retainer opening 86 to secure the sliding lock member 80 to the pump housing 40 in a position disposed between the inlet port 44 and the outlet port 46.

The inlet port 44 and the outlet port 46 preferably each include a channel 90 or groove for receiving the first portion 82 of the sliding lock member 80. Thus, when the sliding lock member 80 is in the locked position, the first portion 82 of the sliding lock member 80 is received in the channels 90 of the inlet port 44 and the outlet port 46 so as to engage and retain removable fittings 92, 94 within the inlet port 44 and the outlet port 46. When the sliding lock member 80 is in the locked position, however, the second portion 84 of the sliding lock member 80 is positioned adjacent the channels 90 of the inlet port 44 and the outlet port 46, but without engaging and retaining the removable fittings 92, 94 within the inlet port 44 and the outlet port 46. Thus, the inlet and outlet ports 44, 46 may be connected or disconnected to supply and discharge lines in a tool-less manner.

Moreover, for each removable pump, the inlet port 44 preferably has a first cross-sectional area and the outlet port 46 preferably has a second cross-sectional area which is different from the first cross-sectional area. Also, in some instances, it is preferable that for each removable pump 14, the inlet port 44 has a first cross-sectional diameter and the outlet port 46 has a second cross-sectional diameter which is different from the first cross-sectional diameter.

The removable fitting 92 for the supply line has a cross-sectional area and a cross-sectional diameter adapted to fit into the inlet port 44 but not the outlet port 46. Meanwhile, the removable fitting 94 for the discharge line has a cross-sectional area and a cross-sectional diameter adapted to fit into the outlet port 46 but not the inlet port 44. In this manner, it will be appreciated that improper connection of the supply line to the outlet port 46, or of the discharge line to the inlet port 44, may be prevented.

In another aspect, a sensor and control system is also provided for the removable pumps 14. This sensor and control system allows a positive displacement pump mechanism, such the aforementioned gear pump mechanism, to be used safely and without damage to the equipment. Referring again to FIGS. 1-5, each removable pump 14 in this regard also includes a pressure transducer 100 disposed adjacent the sensor port 48. Each pressure transducer 100 preferably includes a ceramic piezo disc. The transducer 100 is in contact with a quantity of the fluid at the second (i.e. discharge) pressure and generates an electrical signal which is proportional to the second pressure.

Each removable pump 14 also includes a separate programmable micro controller 102, which receives the electrical signals from the pressure transducer 100 via an electric cable 104 and is electrically connected to the pump motor 60 and capable of starting and stopping the pump motor 60. The programmable micro controller 102 may be enclosed for instance within a housing 106 attached to the pump motor 60. In some instance, a heat dissipater 108 such as a metal plate or fin, may also be attached to the exterior of the housing to facilitate cooling.

A common control panel 110 is also provided for controlling each of the plurality of removable pumps 14. This control panel 110 is preferably disposed on the front panel 16 of the pump enclosure 12. The common control panel 110 is electrically connected to each of the pump microcontrollers via a plurality of wires 116. The control panel 110 includes at least one reset switch 112 for each removable pump 14, the reset switch 112 being electrically connected to the programmable micro controller 102 for the removable pump 14.

The control panel 110 also includes at least one pump condition indicator 114 for each removable pump 14. The at least one pump condition indicator 114 is electrically connected to the programmable micro controller 102 for the removable pump 14, and each pump condition indicator 114 is capable of indicating a plurality of pump conditions. Preferably the condition indicators 114 are indicator lights, such as LED lights. Alternatively, the condition indicators 114 could be provided by audible alarms, by a video display, and the like. In a particularly preferred embodiment, the least one reset switch 112 for each removable pump 14 is preferably a membrane switch and the at least one pump condition indicator 114 for each removable pump 14 is incorporated into this membrane switch.

In some instances, the control panel 110 may include at least two pump condition indicators 114 for each removable pump 14, with each pump condition indicator 114 being capable of indicating a plurality of pump conditions.

For each of the plurality of removable pumps 14, the micro controller 102 is generally programmed to start or stop the pump, and to signal a particular pump condition (using the pump condition indicator) based on the second pressure information received from the pressure transducer 100.

For instance, if the second pressure exceeds a first predetermined pressure threshold (e.g., greater than 85 psi), the micro controller 102 is preferably programmed to stop the pump motor 60 and the at least one pump condition indicator signals a first pump condition. This first pump condition corresponds to a ready, standby condition for the pump. This may for instance be signaled on control panel 110 by a solid green indicator light.

If the second pressure drops below a second predetermined pressure threshold (e.g., less than 15 psi), the micro controller 102 is preferably programmed to stop the pump motor 60 and the at least one pump condition indicator 114 signals a second pump condition. This second pump condition corresponds to an empty syrup bag condition for the pump. This may for instance be signaled on control panel 110 by a flashing red light. This will indicate to the operator that the beverage syrup container is empty and needs to be replaced. After replacement of the syrup container, a manual reset of the pump, using the reset switch, may be required.

If the third pressure is between the first and the second predetermined pressure thresholds, the micro controller 102 is preferably programmed to start the pump motor 60 and the at least one pump condition indicator 114 signals a third pump condition. This third pump condition corresponds to the normal pumping and syrup dispensing condition for the pump. This may for instance be signaled on control panel 110 by a rapidly flashing green light.

If the second pressure remains between the first and the second predetermined pressure thresholds for a time period which exceeds a predetermined time threshold (e.g., more than 1 minute), the micro controller 102 is preferably programmed to stop the pump motor 60 and the at least one pump condition indicator 114 signals a fourth pump condition. This fourth pump condition corresponds to a condition in which the pump is operable, but there is air trapped within the discharge line. This may for instance be signaled on control panel 110 by a more slowly flashing green light.

Alternatively, the micro controller 102 may be programmed to stop the pump motor 60 and the at least one pump condition indicator 114 signals a fourth pump condition, if the second pressure remains between a third predetermined pressure threshold and a fourth predetermined pressure threshold (e.g. from 30 to 60 psi) for a time period which exceeds a predetermined time threshold (e.g., more than 1 minute). This again corresponds to a condition in which the pump is operable, but there is air trapped within the discharge line, but uses a narrower pressure range to define this condition.

Figure 15:
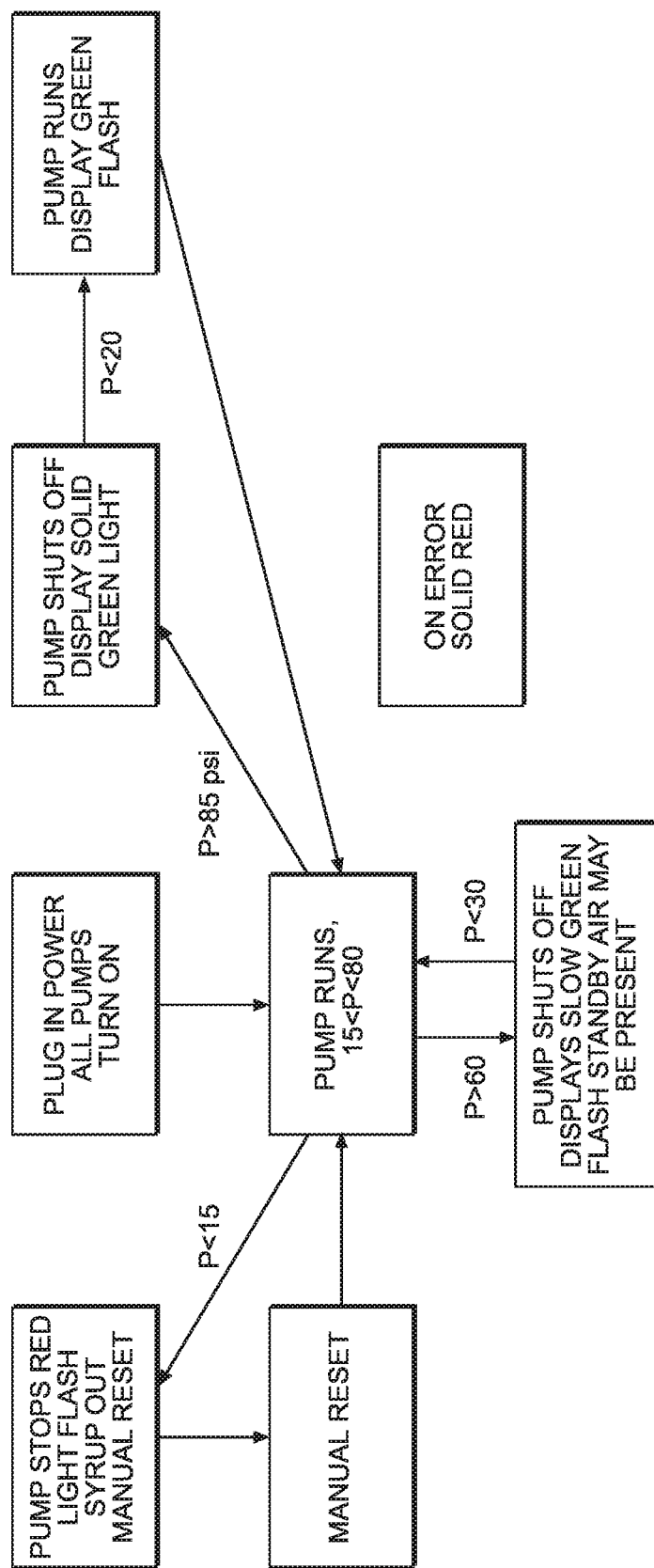
FIG. 15 is a flowchart illustrating a pump control scheme in accordance with one embodiment of the present disclosure.

The aforementioned control scheme is summarized in the flowchart schematic of FIG. 15.

Beneficially, the sensor and control system facilitates the replacement of conventional gas-driven diaphragm pumps with positive displacement pumps such as the electrically-driven gear pumps described above. Specifically, the sensor and control system allows the operation of the positive displacement pumps to be monitored and managed so as to reduce or prevent pump overheating and/or deadhead overpressurization situations.

Figure 14:
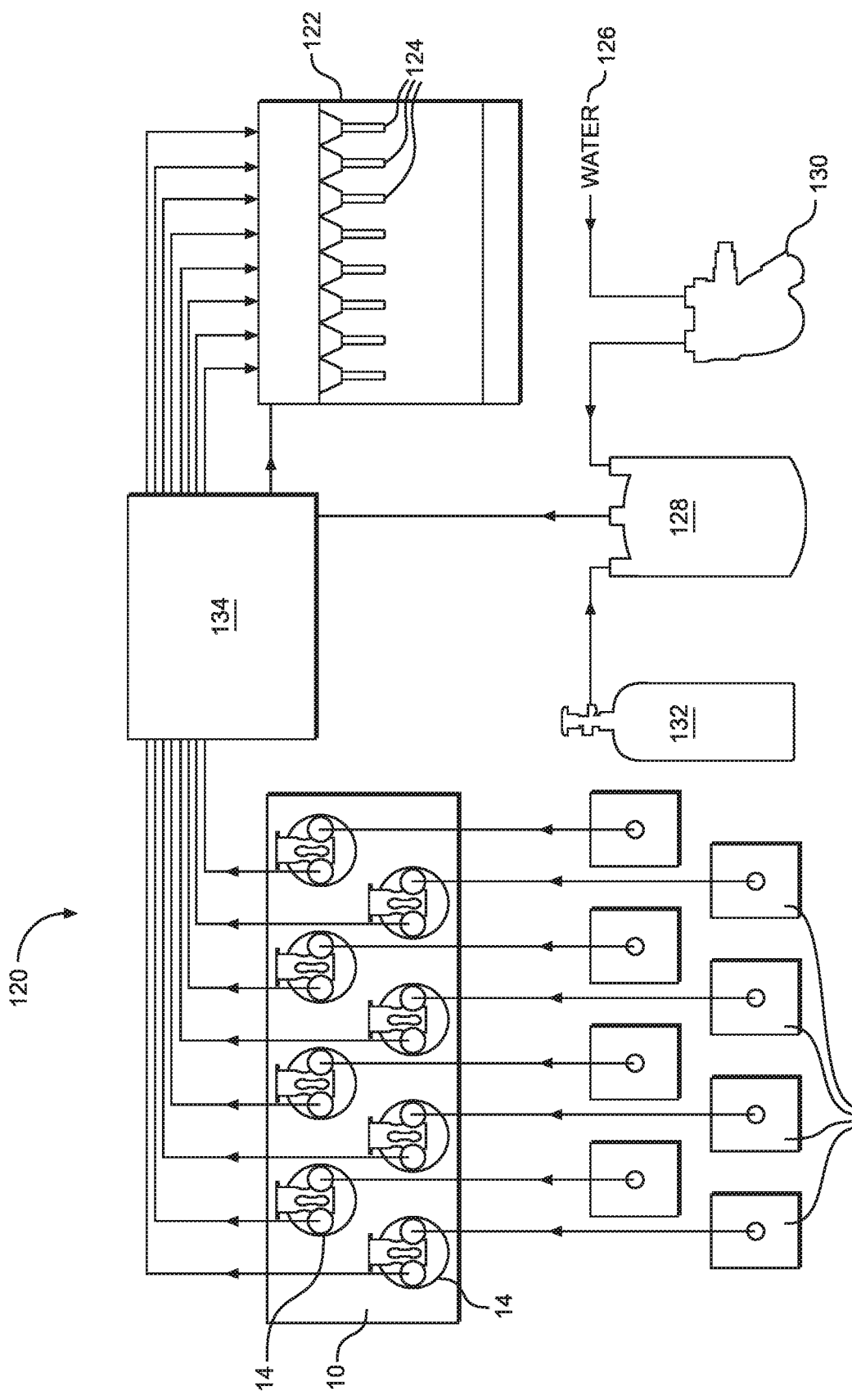
FIG. 14 is schematic diagram illustrating a beverage dispenser system in accordance with one embodiment of the present disclosure.

In a further aspect, the present disclosure also relates to a post-mix beverage dispenser system 120, which utilizes a multiple-pump controlled and removable pump system 10 as described above. As shown in FIG. 14, the post-mix beverage dispenser system 120 includes a beverage dispensing station 122 having a plurality of beverage mixing and dispensing nozzles 124 and a supply of carbonated water in flow communication with each of the beverage mixing and dispensing nozzles 124. For instance, the beverage dispenser may include a water carbonation system, in which a source of non-carbonated water 126 (such as a municipal water supply line) is pumped into a carbonation tank 128 by a water pump 130. This mixing tank 128 is also in flow communication with a source of carbon dioxide gas 132 such as a compressed gas cylinder. Water is pumped into the mixing tank 128, and carbon dioxide gas is then mixed with, and dissolved into, the water in the mixing tank 128 to provide carbonated water. The carbonated water may also be passed through a chiller 134 before reaching the mixing and dispensing nozzles 124.

In addition, the post-mix beverage dispenser system 120 also includes a plurality of beverage syrup containers 136, each container having a supply of concentrated beverage syrup. These beverage syrup containers 136 may be provided as bag-in-box syrup containers for instance.

The post-mix beverage dispenser system 120 also includes a multiple-pump syrup pump system 10, with a separate syrup pump for each beverage mixing and dispensing nozzle 124. Thus, each dispensing nozzle 124 is also connected to, and in flow communication with, one bag-in-box or other beverage syrup container 136. The controlled pump system 10 described above may be used to move the syrup from the syrup container to the dispensing nozzle 124. Thus the syrup container 136 is connected to the pump inlet port 44 and the pump outlet port 46 is connected to the beverage mixing and dispensing nozzle in order to supply the beverage syrup for the nozzle 124.

As noted above, each pump of the multiple-pump removable pump system 10 is configured to be quickly removable from, or installed in, the pump enclosure 12 in a tool-less manner. The tool-less removable of a pump from the enclosure 12 is illustrated in FIGS. 6 through 13.

Figure 7:
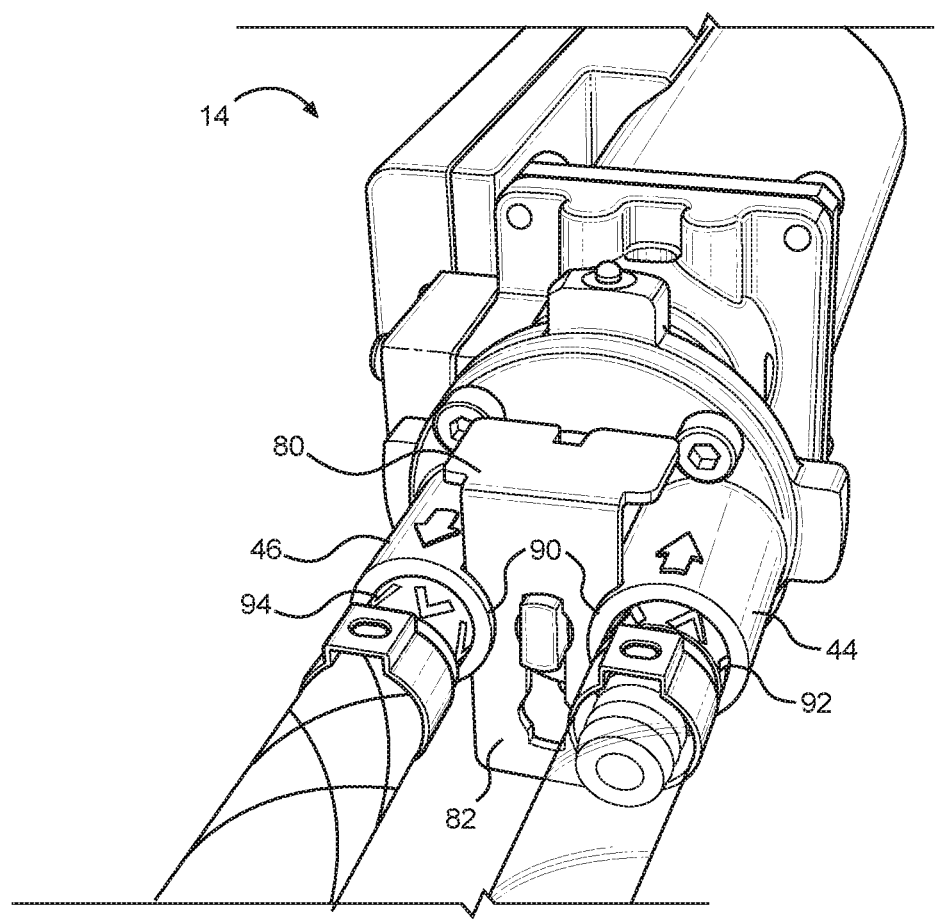

In normal operation, the sliding lock member 80 begins in the locked position as shown in FIG. 6, wherein the first portion 82 of the sliding lock member 80 is received in the channels 90 of the inlet port 44 and the outlet port 46 so as to engage and retain the removable fittings 92, 94 for the supply and discharge lines within the inlet port 44 and the outlet port 46, respectively. The sliding lock member 80 is then moved to the unlocked position as shown in FIG. 7, wherein the second portion 84 of the sliding lock member 80 is positioned adjacent the channels 90 of the inlet port 44 and the outlet port 46. The second portion 84 does not engage or retain the removable fittings 92, 94 within the inlet port 44 and the outlet port 46.

Figure 8:
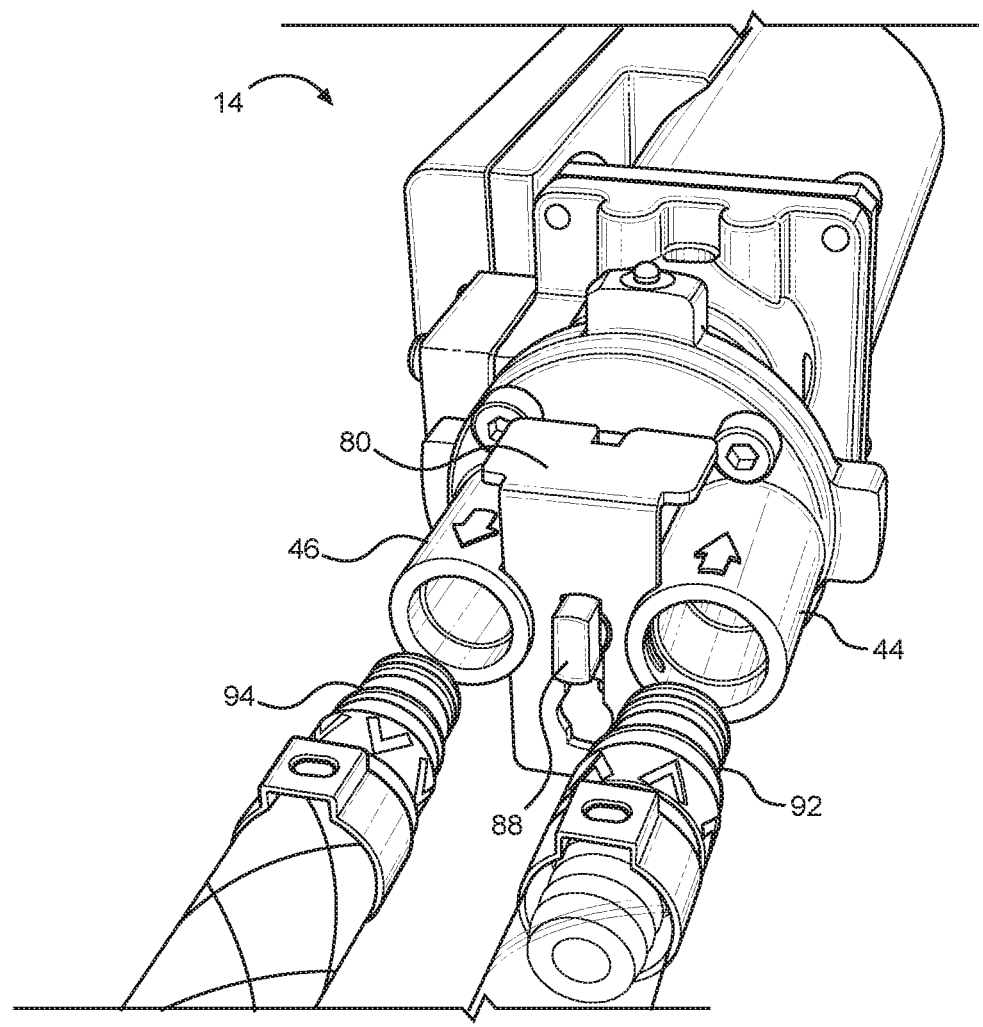
Figure 9:
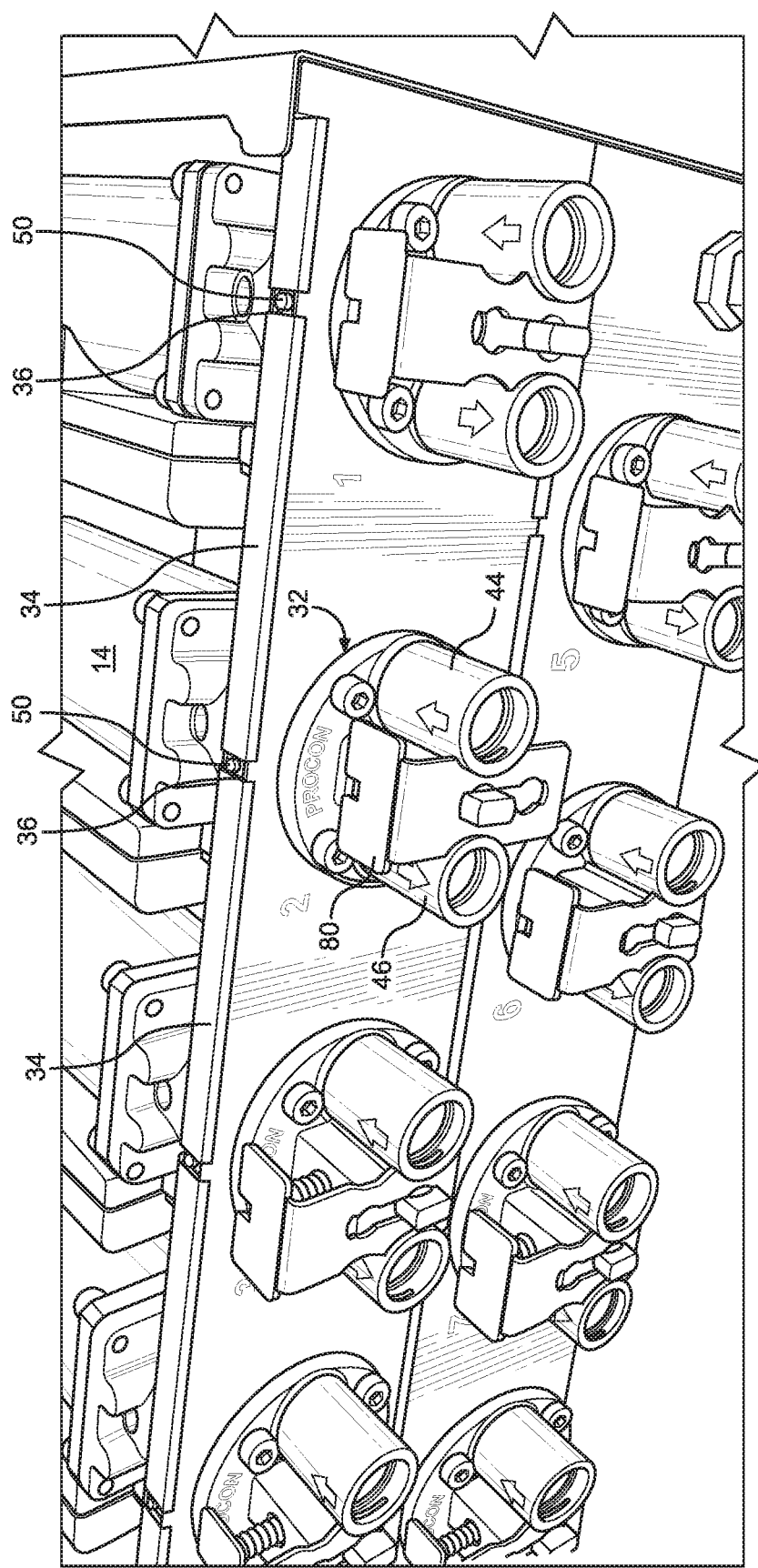

The fitting 92 for the supply line may then be removed from the inlet port 44, and the fitting 94 for the discharge line may be removed from the outlet port 46, as illustrated in FIG. 8. With the supply and discharge lines removed, the pump remains attached to the rear panel 18 of the enclosure 12, as shown in FIG. 9.

Figure 10:
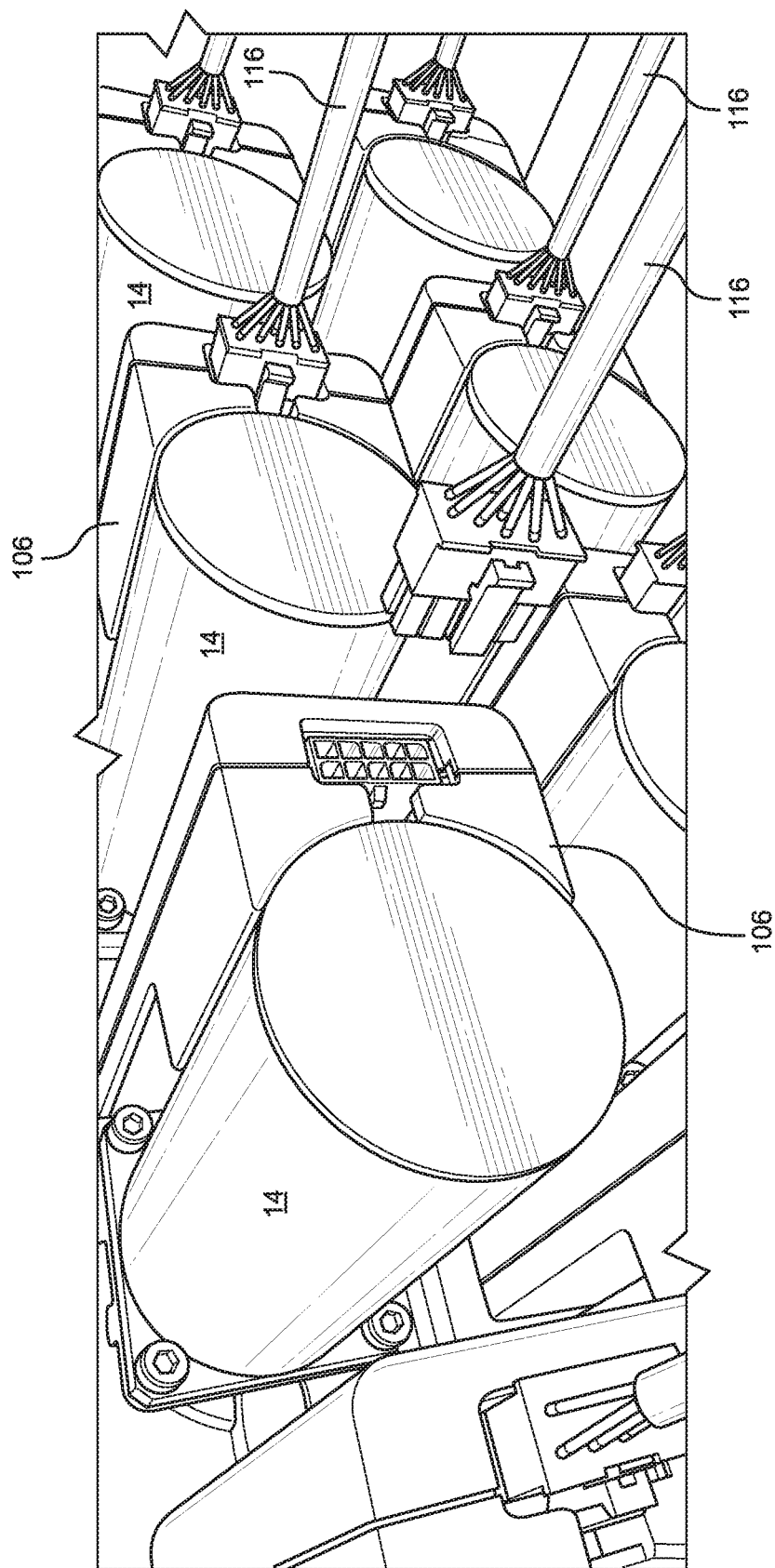
FIGS. 10-13 are front perspective views illustrating steps in the removal of a beverage syrup pump from a pump enclosure in accordance with one embodiment of the present disclosure.

The wiring 116 providing electrical connection between the micro controller 102 and the common control panel 110 is then disconnected, as shown in FIG. 10.

Figure 11:
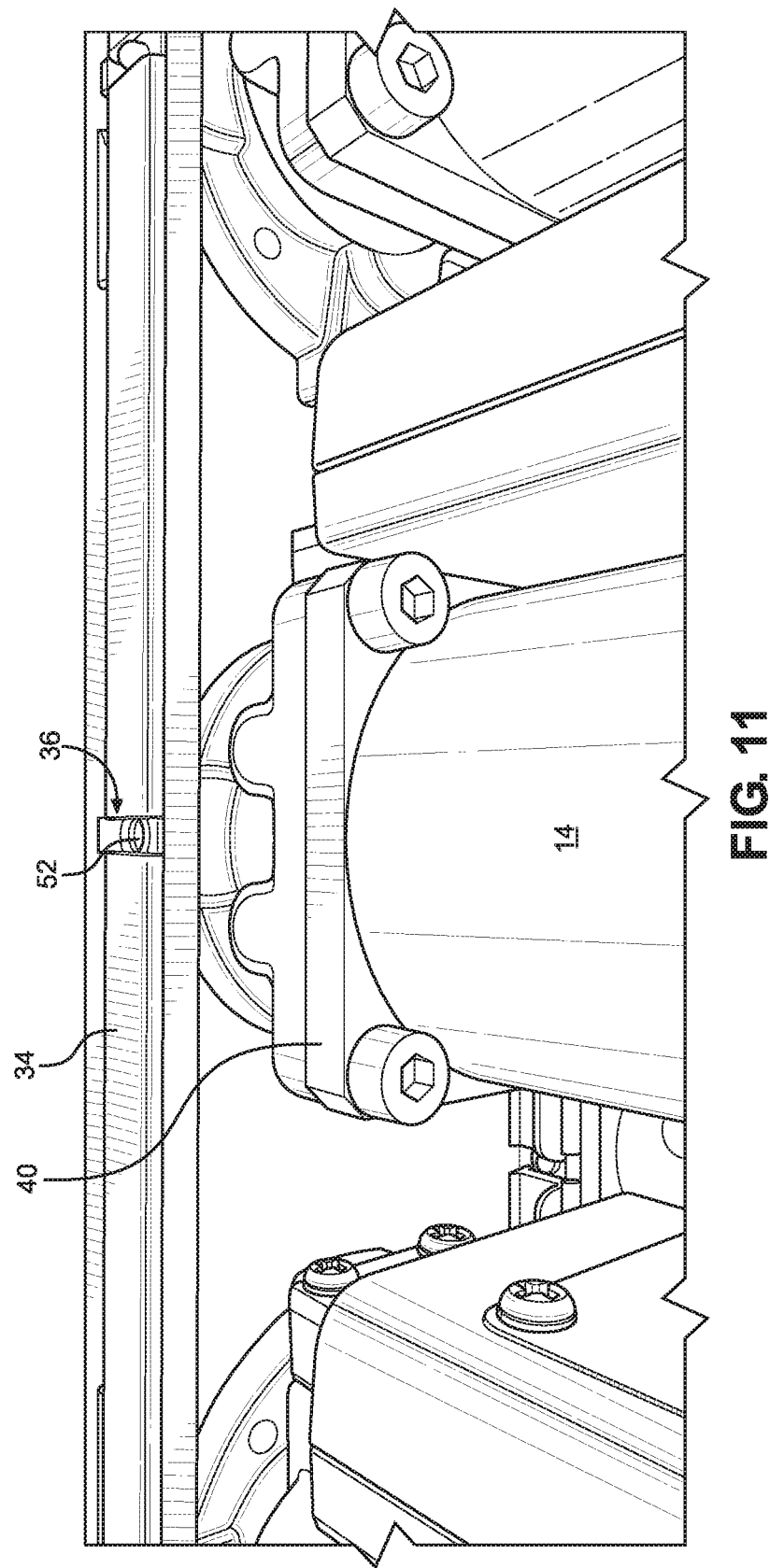
Figure 12:
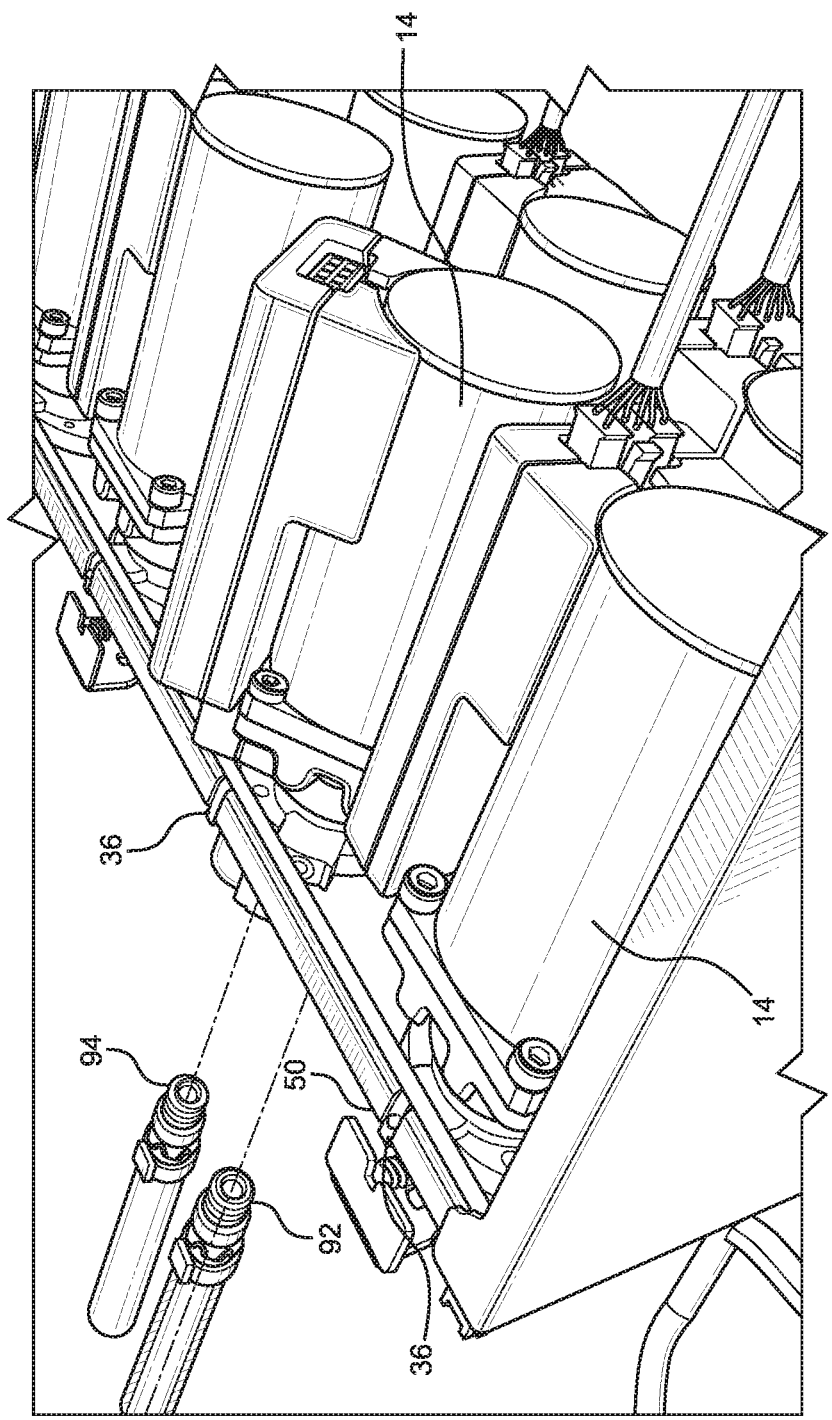
Figure 13:
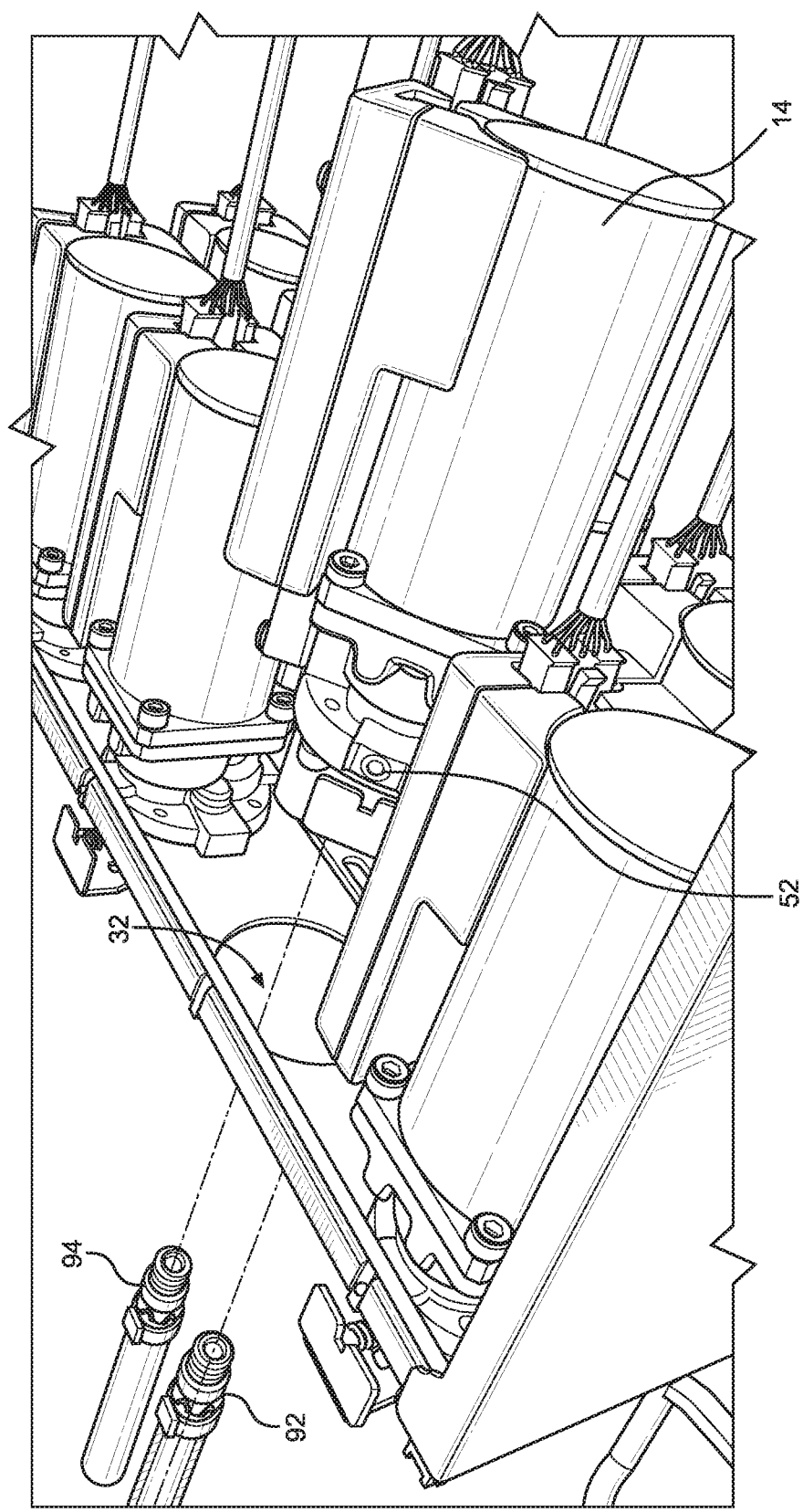

The spring biased retainer pin 50, which as noted above, normally extends through one of the slots 36 formed in the rear panel 18 of enclosure 12 is then depressed so as to remove the pin from the rear panel slot 36, as shown in FIG. 11. The pump may then be rotated within its rear panel opening 32 until the retainer pin 50 clears the horizontal lip 34 of the rear open, as shown in FIG. 12. Finally, the pump may be withdrawn from the rear panel opening 32 and removed from the pump enclosure 12, as illustrated in FIG. 13.

Tool-less installation of a new pump is accomplished by reversing the foregoing steps. In brief, a portion of a pump is inserted through a rear panel opening 32 of the enclosure 12 and then rotated until the retainer pin 50 aligns with and engages the slot 36 formed in the lip 34 above the rear panel opening 32. Wiring connections between the micro controller 102 and the control panel 110 are established. A syrup supply line is attached to the inlet port 44, and a discharge supply line is attached to the outlet port 46. Finally, the sliding lock member 80 is moved from the unlocked position to the locked position in order to retain the supply and discharge line in place.

Advantageously then, according to the present disclosure, a post-mix beverage dispenser is disclosed which does not utilize a gas driven diaphragm pump in order to pump the beverage syrup.

Thus, the beverage syrup being pumped is no longer in contact with the rubber diaphragms used in such pumps, thereby preventing flavor cross-contamination within the pumps.

In addition, by eliminating the gas driven diaphragm pump (and providing instead a controlled positive displacement pump), the risk of leakage of carbon dioxide or other inert gases from the diaphragm pump is likewise eliminated. Thus, the significant confined space asphyxiation hazard presented by such carbon dioxide leaks is also eliminated.

Further still, the diaphragm pumps eventually require service and/or replacement, requiring significant down time while trained technician services pumps system.

Moreover, the beverage syrup pumps provided may be easily and quickly serviced, without the need for special tools or specially trained technicians.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A multiple-pump controlled pump system comprising:
   a pump enclosure adapted for receiving a plurality of removable pumps;
   a plurality of removable pumps at least partially disposed within the pump enclosure, each removable pump including
      a pump housing having an internal pumping chamber, an inlet port, an outlet port, and a sensor port, each of the ports being in flow communication with the pumping chamber,
      a pump motor,
      a pumping mechanism driven by the pump motor and at least partially disposed within the pumping chamber, the pumping mechanism being capable of receiving a fluid through the inlet port into the pumping chamber at a first pressure and discharging the fluid from the pumping chamber through the outlet port at a second pressure which is greater than the first pressure,
      a pressure transducer disposed adjacent the sensor port, the transducer being in contact with a quantity of the fluid at the second pressure and generating an electrical signal based upon the second pressure, and
      a programmable micro controller, which receives the electrical signals from the pressure transducer, and is electrically connected to the pump motor and capable of starting and stopping the pump motor;
   a common control panel for controlling each of the plurality of removable pumps, the control panel including
      at least one reset switch for each removable pump electrically connected to the programmable micro controller for the removable pump, and
      at least one pump condition indicator for each removable pump electrically connected to the programmable micro controller for the removable pump, each pump condition indicator being capable of indicating a plurality of pump conditions,
   wherein for each of the plurality of removable pumps the pumping mechanism comprises:
   a drive gear, having a plurality of drive gear teeth, disposed within the pumping chamber and rotatably driven by the pump motor; and
   an idler gear, having a plurality of idler gear teeth intermeshed with the drive gear teeth, disposed within the pumping chamber and attached to an idler shaft disposed within the pumping chamber, and wherein the sensor port is located downstream of the drive gear and the idler gear.

2. The multiple-pump controlled pump system of claim 1, wherein for each of the plurality of removable pumps the pressure transducer comprises a ceramic piezo disc.

3. The multiple-pump controlled pump system of claim 1, wherein the control panel includes at least two pump condition indicators for each removable pump, each pump condition indicator being capable of indicating a plurality of pump conditions.

4. The multiple-pump controlled pump system of claim 1, wherein the least one reset switch for each removable pump is a membrane switch and the at least one pump condition indicator for each removable pump is incorporated into the membrane switch.

5. The multiple-pump controlled pump system of claim 1, wherein, for each of the plurality of removable pumps, the micro controller is programmed to stop the pump motor and the at least one pump condition indicator signals a first pump condition if the second pressure exceeds a first predetermined pressure threshold.

6. The multiple-pump controlled pump system of claim 1, wherein, for each of the plurality of removable pumps, the micro controller is programmed to stop the pump motor and the at least one pump condition indicator signals a second pump condition if the second pressure drops a second predetermined pressure threshold.

7. The multiple-pump controlled pump system of claim 1, wherein, for each of the plurality of removable pumps, the micro controller is programmed to start the pump motor and the at least one pump condition indicator signals a third pump condition if the second pressure is between the first and the second predetermined pressure thresholds.

8. The multiple-pump controlled pump system of claim 1, wherein, for each of the plurality of removable pumps, the micro controller is programmed to stop the pump motor and the at least one pump condition indicator signals a fourth pump condition if the second pressure remains between the first and the second predetermined pressure thresholds for a time period which exceeds a predetermined time threshold.

9. The multiple-pump controlled pump system of claim 1, wherein, for each of the plurality of removable pumps, the micro controller is programmed to stop the pump motor and the at least one pump condition indicator signals a fourth pump condition if the second pressure remains between a third predetermined pressure threshold and a fourth predetermined pressure threshold for a time period which exceeds a predetermined time threshold.

10. The multiple-pump removable pump system of claim 1, wherein the removable pumps are beverage syrup pumps.

11. A post-mix beverage dispenser system comprising:
a beverage dispensing station having a plurality of beverage mixing and dispensing nozzles;
a supply of carbonated water in flow communication with each of the beverage mixing and dispensing nozzles;
a plurality of beverage syrup containers, each container having a supply of concentrated beverage syrup; and
a multiple-pump syrup controlled pump system comprising:
a pump enclosure adapted to house a plurality of syrup pumps;
a plurality of syrup pumps disposed within the pump enclosure, each syrup pump including
a pump housing having an internal pumping chamber, an inlet port in flow communication with one of the beverage syrup containers and with the pumping chamber, an outlet port in flow communication with the pumping chamber and with one of the beverage mixing and dispensing nozzles, and a sensor port in flow communication with the pumping chamber,
a pump motor,
a pumping mechanism driven by the pump motor and at least partially disposed within the pumping chamber, the pumping mechanism being capable of receiving a fluid through the inlet port into the pumping chamber at a first pressure and discharging the fluid from the pumping chamber through the outlet port at a second pressure which is greater than the first pressure, and
a pressure transducer disposed adjacent the sensor port, the transducer being in contact with a quantity of the fluid at the second pressure and generating an electrical signal based upon the second pressure,
a programmable micro controller, which receives the electrical signals from the pressure transducer, and is electrically connected to the pump motor and capable of starting and stopping the pump motor; and
a common control panel for controlling each of the plurality of syrup pumps, the control panel including
at least one reset switch for each syrup pump electrically connected to the at least one programmable micro controller for the removable pump, and
at least one pump condition indicator for each removable pump electrically connected to the programmable micro controller for the removable pump, each pump condition indicator being capable of indicating a plurality of pump conditions,
wherein for each of the plurality of syrup pumps the pumping mechanism comprises:
a drive gear, having a plurality of drive gear teeth, disposed within the pumping chamber and rotatably driven by the pump motor; and
an idler gear, having a plurality of idler gear teeth intermeshed with the drive gear teeth, disposed within the pumping chamber and attached to an idler shaft disposed within the pumping chamber,
and wherein the sensor port is located downstream of the drive gear and the idler gear.

12. The post-mix beverage dispenser system of claim 11, wherein for each of the plurality of syrup pumps the pressure transducer comprises a ceramic piezo disc.

13. The post-mix beverage dispenser system of claim 11, wherein the control panel includes at least two pump condition indicators for each syrup pump, each pump condition indicator being capable of indicating a plurality of pump conditions.

14. The post-mix beverage dispenser system of claim 11, wherein the least one reset switch for each syrup pump is a membrane switch and the at least one pump condition indicator for each syrup pump is incorporated into the membrane switch.

15. The post-mix beverage dispenser system of claim 11, wherein, for each of the plurality of removable pumps, the micro controller is programmed to stop the pump motor and the at least one pump condition indicator signals a first pump condition if the second pressure exceeds a first predetermined pressure threshold.

16. The post-mix beverage dispenser system of claim 11, wherein, for each of the plurality of removable pumps, the micro controller is programmed to stop the pump motor and the at least one pump condition indicator signals a second pump condition if the second pressure drops a second predetermined pressure threshold.

17. The post-mix beverage dispenser system of claim 11, wherein, for each of the plurality of removable pumps, the micro controller is programmed to start the pump motor and the at least one pump condition indicator signals a third pump condition if the second pressure is between the first and the second predetermined pressure thresholds.

18. The post-mix beverage dispenser system of claim 11, wherein, for each of the plurality of removable pumps, the micro controller is programmed to stop the pump motor and the at least one pump condition indicator signals a fourth pump condition if the second pressure remains between the first and the second predetermined pressure thresholds for a time period which exceeds a predetermined time threshold.

19. The post-mix beverage dispenser system of claim 11, wherein, for each of the plurality of removable pumps, the micro controller is programmed to stop the pump motor and the at least one pump condition indicator signals a fourth pump condition if the second pressure remains between a third predetermined pressure threshold and a fourth predetermined pressure threshold for a time period which exceeds a predetermined time threshold.

* * * * *